(12) United States Patent  
Hwang (10) Patent No.: US 9,122,388 B2  
(45) Date of Patent: Sep. 1, 2015

(54) METHOD AND APPARATUS FOR CONTROLLING TOUCH SCREEN USING TIMELINE BAR, RECORDING MEDIUM WITH PROGRAM FOR THE SAME RECORDED THEREIN, AND USER TERMINAL HAVING THE SAME

(75) Inventor: Sung-Jae Hwang, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 13/324,370

(22) Filed: Dec. 13, 2011

(65) Prior Publication Data

US 2012/0151401 A1    Jun. 14, 2012

(30) Foreign Application Priority Data

Dec. 14, 2010  (KR) .................. 10-2010-0127309

(51) Int. Cl.
| | | |
|---|---|---|
| *G06F 3/0481* | (2013.01) | |
| *G06F 3/0488* | (2013.01) | |
| *G06F 3/0484* | (2013.01) | |

(52) U.S. Cl.
CPC .......... *G06F 3/0488* (2013.01); *G06F 3/04847* (2013.01)

(58) Field of Classification Search
CPC ..... G06F 3/0481; G06F 9/44543; G06F 8/34; G06F 3/0485; G06F 3/04855; G06F 3/04883; G06F 1/1626; G06F 3/0488; G06F 3/04847; G06F 3/0482; G06F 3/00; G06F 3/01; G06F 3/041; G06F 3/048; G09G 2340/0407

USPC ......... 715/764, 765, 771, 784, 786, 800, 810, 715/833, 835, 863, 864; 345/169, 173, 660, 345/661

See application file for complete search history.

(56) References Cited

U.S. PATENT DOCUMENTS

| | | | |
|---|---|---|---|
| 7,934,169 B2 * | 4/2011 | Reponen .................... | 715/833 |
| 2010/0039400 A1 | 2/2010 | Jang | |
| 2010/0099462 A1 * | 4/2010 | Baek et al. ................. | 455/566 |
| 2010/0173678 A1 * | 7/2010 | Kim et al. ................... | 455/566 |
| 2011/0035700 A1 * | 2/2011 | Meaney et al. ............. | 715/784 |
| 2011/0074714 A1 * | 3/2011 | Ogawa et al. .............. | 345/173 |
| 2011/0239155 A1 * | 9/2011 | Christie ...................... | 715/784 |
| 2011/0246875 A1 * | 10/2011 | Parker et al. .............. | 715/702 |
| 2011/0246882 A1 * | 10/2011 | Kollenkark et al. ........ | 715/716 |
| 2012/0162265 A1 * | 6/2012 | Heinrich et al. ........... | 345/661 |

FOREIGN PATENT DOCUMENTS

| | | |
|---|---|---|
| CN | 101482795 A | 7/2009 |
| CN | 101727949 A | 6/2010 |
| CN | 101751221 A | 6/2010 |

(Continued)

*Primary Examiner* — Xiomar L Bautista  
(74) *Attorney, Agent, or Firm* — Jefferson IP Law, LLP (57) ABSTRACT

A method for controlling a touch screen using a timeline bar is provided. The method includes detecting a first dragging that starts from a bar on a timeline, zooming in the timeline according to a distance between the timeline and a final touch point of the first dragging, and shifting the bar on the zoomed-in timeline by a second dragging. Thus, it is possible to more precisely control the content even on a small touch screen just like on a large touch screen. In addition, the timeline blockage caused by the finger tip may be prevented, so the user may control the content more intuitively in the desired level.

17 Claims, 6 Drawing Sheets

(56) References Cited

FOREIGN PATENT DOCUMENTS

| KR | 10-2009-0085777 A | 8/2009 |
| KR | 10-2010-0020311 A | 2/2010 |
| KR | 10-2010-0027686 A | 3/2010 |
| KR | 10-2010-0051707 A | 5/2010 |

* cited by examiner

METHOD AND APPARATUS FOR CONTROLLING TOUCH SCREEN USING TIMELINE BAR, RECORDING MEDIUM WITH PROGRAM FOR THE SAME RECORDED THEREIN, AND USER TERMINAL HAVING THE SAME

PRIORITY

This application claims the benefit under 35 U.S.C. §119(a) of a Korean Patent Application filed in the Korean Intellectual Property Office on Dec. 14, 2010 and assigned Ser. No. 10-2010-0127309, the entire disclosure of which is hereby incorporated by reference.

BACKGROUND OF THE INVENTION

1. Field of the Invention

The present invention relates to a method and apparatus for operating a user terminal More particularly, the present invention relates to an apparatus and method for controlling a touch screen using a timeline bar (consisting of a timeline and a bar) and a recording medium with a program for the same recorded therein.

2. Description of the Related Art

A touch screen or a touch panel refers to a user interface device that can detect a user's touch and, using stored software, perform a process corresponding to the touch. For example, when a user touches a character or an image displayed on a touch screen with an input means, such as a finger tip, a stylus, or a similar object, a function corresponding to the character or image is executed. A benefit of using a touch screen or a touch panel is that user input can be received without using a keyboard. Typically, the user's finger tip is used as the input means, causing low touch accuracy due to the large surface area of the user's finger tip. To address this problem, a hardware solution such as the stylus pen has been proposed. However, the separate stylus pen may be lost inadvertently, and inconveniently requires two hands for its utilization.

A timeline bar is popularly used as a content manipulation means for manipulations such as Play, Rewind, and Fast Forward of video. Generally, the timeline bar includes a timeline corresponding to the full content length or the full range of manipulation parameters (e.g., sound, brightness, etc.), and a bar representing the current level.

Figure 1:
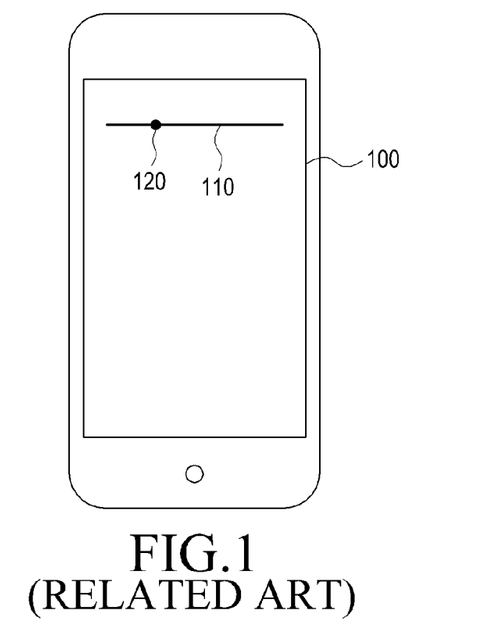
FIG. 1 illustrates a timeline bar displayed on a touch screen for controlling content according to the related art.

FIG. 1 illustrates a timeline bar displayed on a touch screen for controlling content according to the related art.

Referring to FIG. 1, a timeline 110 is displayed in the form of a straight line corresponding to the full length of content such as video and audio, and the timeline 110 includes a bar 120 indicating a position of the content that is actually displayed on a touch screen 100. In operation, a user generally shifts the bar 120, which is an indicator on the timeline 110, with his or her finger tip. However, it may be difficult for the user to manipulate the content to the desired extent due to the fixed scale of the timeline and the large size of the user's finger tip. More particularly, due to the decreasing size of the touch screen and the increasing capacity of the content, the user may suffer significant inconvenience by the fixed-scale timeline 110. Therefore, there is a need for a new interface technique capable of accurately manipulating and controlling multimedia content with less cognitive effort.

SUMMARY OF THE INVENTION

Aspects of the present invention are to address at least the above-mentioned problems and/or disadvantages and to provide at least the advantages described below. Accordingly, an aspect of the present invention is to provide an interface method and apparatus for allowing a user to freely manipulate and control content even on a small touch screen.

Another aspect of the present invention is to provide a recording medium with a program for implementing the proposed interface method and an apparatus recorded therein, and a user terminal having the proposed interface method and apparatus.

In accordance with an aspect of the present invention, a method for controlling a touch screen using a timeline bar is provided. The method includes detecting a first dragging that starts from a bar on a timeline, zooming in the timeline depending on a distance between the timeline and a final touch point of the first dragging, and shifting the bar on the zoomed-in timeline by a second dragging.

In an exemplary implementation, the timeline may be zoomed-in in proportion to the distance.

In an exemplary implementation, the first dragging may be a multi-touch dragging in which an area of the timeline is detected as a touch point. If a distance between two touch points is decreased by the multi-touch dragging, the timeline may be zoomed-out.

In an exemplary implementation, the first dragging and the second dragging may be performed consecutively. The first dragging may be performed in a vertical direction of the touch screen, and the second dragging may be performed in a horizontal direction of the touch screen.

In an exemplary implementation, the final touch point of the first dragging may be determined when the distance between the timeline and the touch point remains unchanged for a predetermined time or more.

In an exemplary implementation, the method may further include restoring the zoomed-in timeline to an initial form thereof if the touch is released after the second dragging. A content frame in a position corresponding to a position of the bar shifted by the second dragging may be displayed on the touch screen.

In an exemplary implementation, the first dragging and the second dragging may be dragging gestures executed by a user's finger tip.

In an exemplary implementation, identification markers may be displayed on the timeline at regular intervals.

In accordance with another aspect of the present invention, a control apparatus for controlling a touch screen using a timeline bar is provided. The control apparatus includes a timeline bar generator for generating a timeline and a bar on the touch screen, a touch detector for detecting a length of a first dragging that starts from the generated timeline, and a controller for zooming in the timeline depending on the dragging length detected by the touch detector.

In an exemplary implementation, the controller may zoom in the timeline depending on a distance between the timeline and a touch point, if the distance between the timeline and the touch point substantially remains unchanged for a predetermined time. The controller may shift the bar displayed on the touch screen depending on a touch point of a second dragging that is performed after the timeline is zoomed-in.

In an exemplary implementation, the control apparatus may further include a display for displaying a content frame corresponding to a position of the shifted bar.

In an exemplary implementation, a recording medium may be provided in which a control command for implementing and driving the method and apparatus is recorded. A user terminal with a touch screen may include the touch screen control apparatus.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'timeline' as used herein may refer to an editing program's workspace where content or continuous data such as video clips and audio clips may be placed in order. The timeline includes layers and frames, and a moving animation or music may be created by placing images or audio of the screen through a combination of the layers. Basically, frames may be continuously showed by adjusting the position, size and image attributes of objects, and components may be effectively edited and managed by registering and managing associated components on different layers. Of course, this description is merely an example provided for convenience of explanation and not intended to be limiting. Rather, the term 'timeline' may refer to a workplace associated with any program in which a continuum of data is manipulated.

In considering the related art illustrated in FIG. 1, the inventor has noticed that the timeline bar is displayed on the top or bottom of the screen and there is considerable space in other directions. Therefore, the inventor provides a technique for changing a scale of the timeline 110 according to a dragging length in the space, i.e., for changing the amount of change in position of the content according to the shift of the bar 120 in unit lengths. By doing so, the timeline 110 may be zoomed-in, thus enabling more precise content control.

Figure 2:
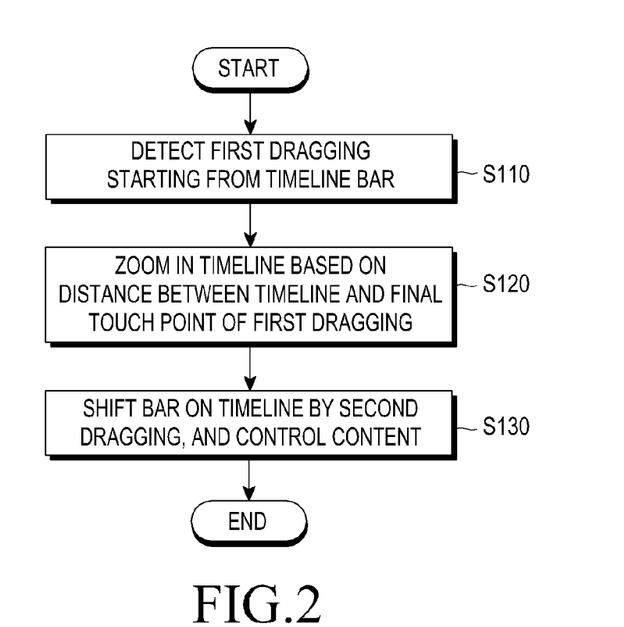
FIG. 2 illustrates a method for controlling a touch screen according to an exemplary embodiment of the present invention.

FIG. 2 illustrates a method for controlling a touch screen according to an exemplary embodiment of the present invention.

Referring to FIG. 2, a first dragging that starts from a timeline area (or a timeline bar) displayed on a touch screen is detected in step S110. The term 'timeline area' as used herein may be construed to include both a timeline for recognition of its touch and a predetermined area near the timeline. The timeline is zoomed-in depending on the distance between the timeline and the final touch point of the first dragging in step S120, and the bar is shifted on the zoomed-in timeline by a second dragging in step S130. Through the double-dragging, the timeline is zoomed-in to a desired level by the first dragging, and shifts the bar to a desired position on the zoomed-in timeline by the second dragging, thereby more precisely controlling the display of content.

In an exemplary implementation, the first dragging is a single-touch dragging starting from the timeline bar. However, the first dragging may alternatively be a multi-touch dragging with one touch point existing in the timeline area. In this case, if the current distance between the multiple touches is longer than the initial distance between the multiple touches, the timeline is zoomed-in. In contrast, if the current distance between the multiple touches is shorter than the initial distance between the multiple touches, the timeline is zoomed-out. In other words, the distance between two touch points at the initial time where the multi-touch was recognized, i.e., at the initial time where a touch point among multiple touch points is detected within the timeline area, is defined as the initial distance, and based thereon, the timeline is zoomed-in/out.

An exemplary method for controlling a touch screen using a timeline bar will be described below with reference to the accompanying drawings.

FIGS. 3 to 7 illustrate a method for controlling a touch screen using a timeline bar according to an exemplary embodiment of the present invention.

Figure 3:
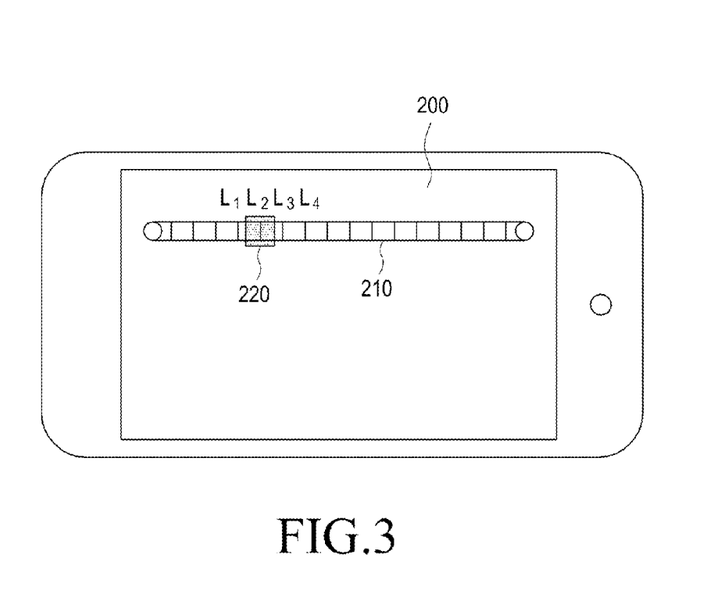
FIGS. 3 to 7 illustrate a method for controlling a touch screen using a timeline bar according to an exemplary embodiment of the present invention.

Referring to FIG. 3, the proposed touch screen control method controls the shift of content displayed on the touch screen using a timeline 210 displayed on a touch screen 200 and a bar 220 displayed thereon.

Figure 4:
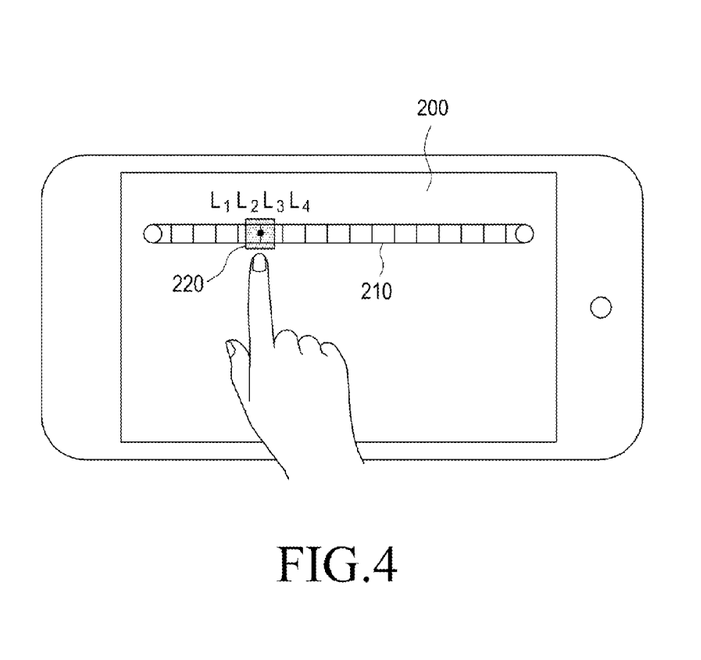

Referring to FIG. 4, the user touches the bar 220 on the timeline 210 displayed in FIG. 3. The position of the bar 220 corresponds to the current position of the content displayed on the touch screen 200.

Figure 5:
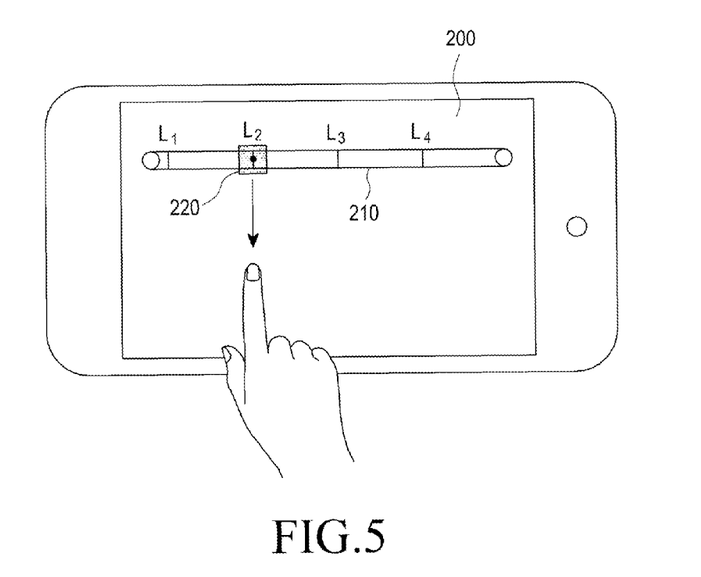

Referring to FIG. 5, the user performs a first dragging in the vertical direction of the touch screen 200, starting from the bar 220 on the timeline 210. The term 'dragging' as used herein may refer to a gesture of shifting a touch input means such as a finger tip, with the touch being maintained. In an exemplary implementation, the timeline 210 is zoomed-in depending on the length of the single-touch dragging (i.e., the first dragging) that is performed starting from the timeline 210 or the bar 220, and the length corresponds to a distance between the timeline 210 and the final touch point of the first dragging. As to the final touch point, when the distance between the timeline 210 and a certain touch point remains substantially unchanged for a predetermined time, the touch point detected at this time will be determined as the final touch point. In an exemplary embodiment of the present invention, while the distance between the timeline 210 and the user's touch point is continuously changed as the first dragging is performed, the change in length due to the first dragging may not be detected, so the timeline 210 may not be zoomed-in.

In an exemplary embodiment of the present invention, the longer the length (hereinafter referred to as a "first dragging length") given by the first dragging is detected, the larger the timeline 210 is zoomed-in. The shorter the first dragging length is detected, the less the timeline 210 is zoomed-in. In an exemplary embodiment of the present invention, identification markers (e.g., vertical lines) are displayed at predetermined positions of the content on the timeline 210, and the interval between the lines L1, L2 and L3 corresponds to a predetermined interval between positions of the content. It can be noted from FIG. 5 that the interval between the unit lines L1, L2 and L3 on the timeline 210 increases depending on the first dragging length starting from the bar 220 on the timeline 210.

Figure 6:
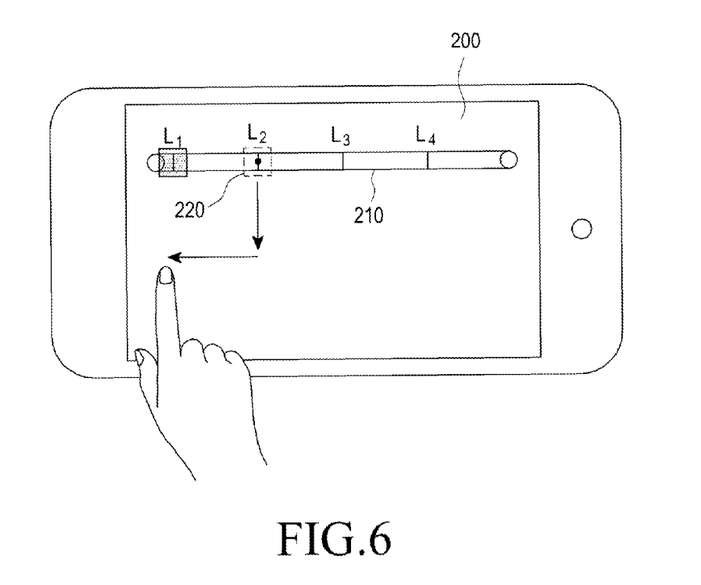

Referring to FIG. 6, if the timeline 210 is zoomed-in to a desired level, the user may shift the bar 220 to a desired position on the timeline 210 by performing a second dragging succeeding the first dragging. The term "successive second dragging" as used herein may refer to a second dragging that is performed with the touch maintained continuously after the first dragging. If the touch is released after the first dragging, it is considered that the successive dragging is not performed.

In an exemplary embodiment of the present invention, the second dragging is a dragging of shifting the bar 220 on the timeline 210 to the left or right, and is distinguishable from the first dragging of shifting the finger tip in the vertical (i.e., the top or bottom) direction to determine the zoom-in ratio of the timeline 210. However, when the timeline 210 or the bar 220 is displayed in the left or right on the touch screen 200, the first dragging may be performed in the horizontal direction and the second dragging may be performed in the vertical direction, which may also fall within the scope of the present invention.

Referring again to FIG. 6, the second dragging gesture is linked with the shift of the bar 220, and the bar 220 is shifted depending on the shift distance of the second dragging gesture. The scale of the timeline 210, on which the bar 220 is shifted, was already changed depending on the zoom-in of the timeline 210 as described above. For example, in FIG. 6, the amount of change in position of the content changed by the second dragging is small (or fine) due to the zoom-in of the timeline 210, thereby enabling fine content control.

Figure 7:
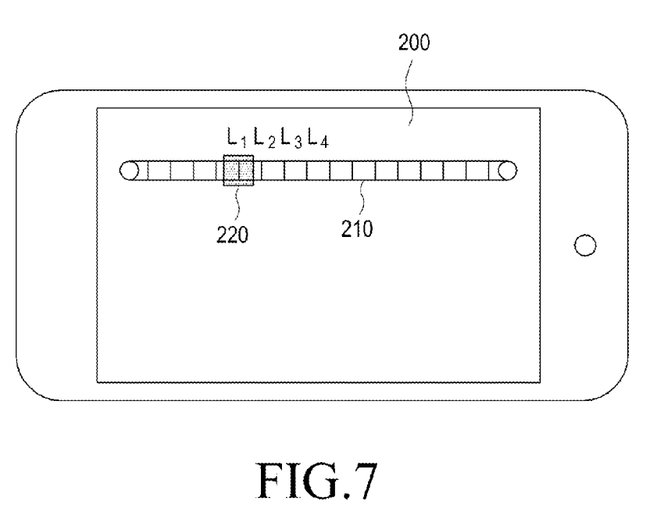

Referring to FIG. 7, the touch is released after the second dragging gesture. In other words, a touch signal is turned off if the user removes his or her finger tip from the touch screen 200, so the timeline bar 210 may be displayed on the touch screen 200 at its initial zoom ratio. However, the shifted position of the bar 220 corresponds to the result of the second dragging that was performed on the zoomed-in timeline 210 in FIG. 6.

Figure 8:
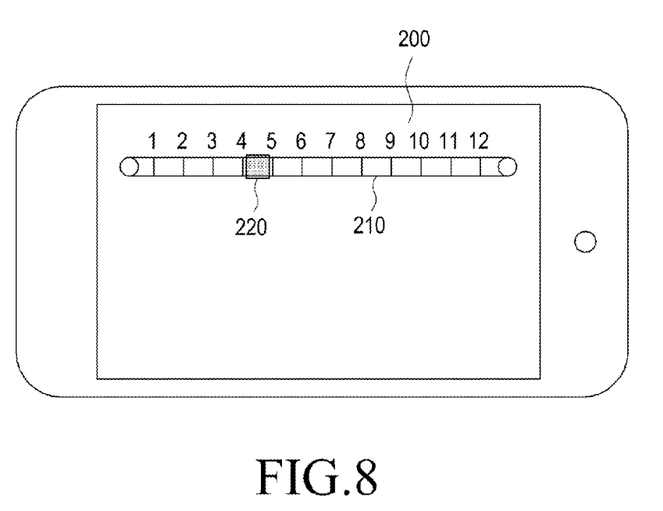
FIGS. 8 to 10 illustrate a method for displaying a frame of a desired image on a touch screen according to an exemplary embodiment of the present invention.
Figure 9:
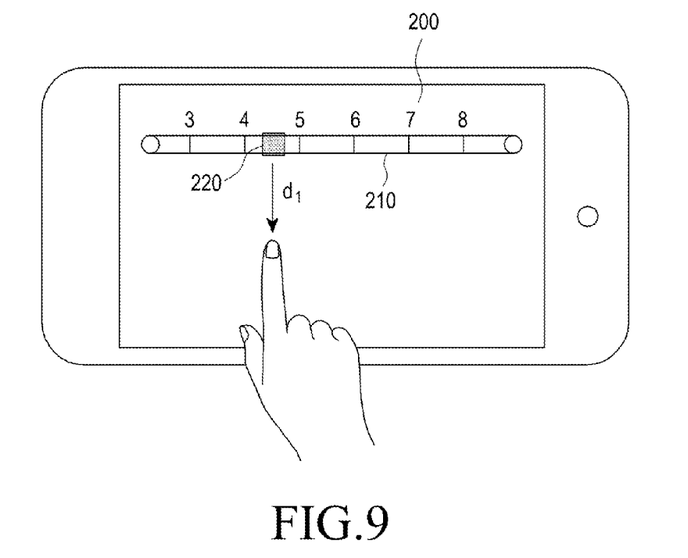
Figure 10:
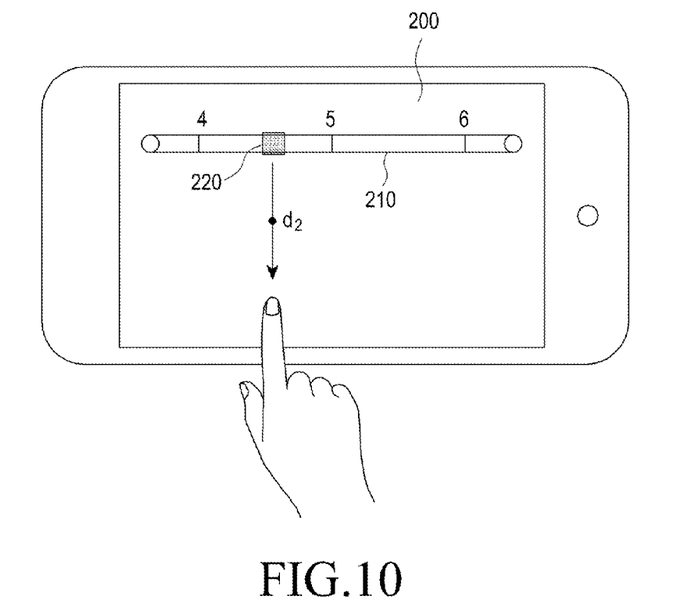

FIGS. 8 to 10 illustrate a method for displaying a frame of a desired image on a touch screen according to an exemplary embodiment of the present invention.

Referring to FIG. 8, the initial dense timeline 210 is displayed on the touch screen 200. In this case, the frame, which can be selected by a large finger tip, may be a reference frame in a level of 1, 2, 3, 4, 5, etc.

Referring to FIG. 9, the timeline 210 is zoomed-in at a predetermined zoom ratio as the user drags his or her finger tip starting from the bar 220 on the timeline 210 by a first distance $d_1$ by performing the first dragging. The bar 220 is shifted to correspond to the second dragging gesture of shifting the bar 220. The amount of the shift of the bar 220 is equivalent to the length of the second dragging. So, the position of the bar 220 may correspond to the frame position between the reference frames. For example, in FIG. 9, the bar 220 is shifted to the middle frame (i.e., a frame of 4.5) between the reference frames of 4 and 5.

Referring to FIG. 10, the timeline 210 is further zoomed-in as the user drags his or her finger tip by a second distance $d_2$ which is greater than the first distance $d_1$. So, the user may shift the bar 220 to the timeline's position corresponding to the fine frame (i.e., a frame of 4.87) between the reference frames of 4 and 5. As the user releases the touch after shifting the bar 220 to his or her desired frame position, the frame corresponding to the shifted position of the bar 220 is displayed on the touch screen 200. Using this technique, exemplary embodiments of the present invention zoom in the timeline 210 to a desired level, making it possible for the user to more precisely control the shifted position of the bar 220 even with a large finger tip. More particularly, the proposed technique may enable more effective content control on the touch screen 200 of the small user terminal Exemplary embodiments of the present invention provide a control apparatus for implementing the proposed timeline-based touch screen control method.

Figure 11:
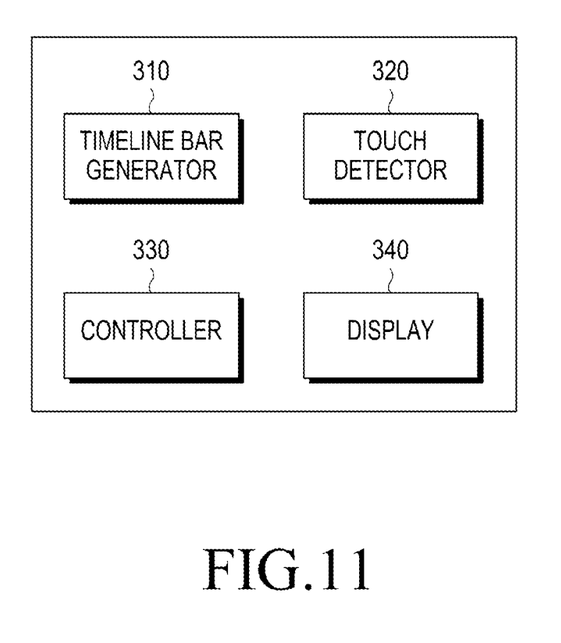
FIG. 11 is a block diagram of a touch screen control apparatus according to an exemplary embodiment of the present invention.

FIG. 11 is a block diagram of a touch screen control apparatus according to an exemplary embodiment of the present invention.

Referring to FIG. 11, the touch screen control apparatus includes a timeline bar generator 310 for generating a timeline and a bar on a touch screen, a touch detector 320 for detecting a length of a first dragging starting from the timeline generated on the touch screen, and a controller 330 for zooming in the timeline depending on the first dragging length detected by the touch detector 320. In an exemplary embodiment of the present invention, if the distance between the timeline and the touch point remains substantially unchanged for a predetermined time, the controller 330 zooms in the timeline depending on the distance between the timeline and the final touch point, and shifts the bar depending on the touch point of the subsequent dragging (i.e., a second dragging).

The proposed timeline-based touch screen control apparatus further includes a display 340 for displaying the content layer or frame corresponding to the shifted position of the bar. In exemplary embodiments of the present invention, the content may be at least one of a video clip, an audio clip, a parameter (e.g., sound, brightness, etc.) capable of continuous increase/decrease, and the like.

More particularly, the proposed timeline-based touch screen control apparatus may be very advantageous for compact user terminals such as mobile terminals. In other words, the proposed touch screen control apparatus may effectively overcome the low-precision control limits caused by the user's large finger tip and the small touch screen.

In an exemplary implementation, the proposed timeline-based touch screen control method and apparatus may be implemented by computer-readable codes stored in a computer-readable recording medium. The computer-readable recording medium may include any type of recording device in which data readable by the computer system is stored. Examples of the recording medium may include a Read-Only Memory (ROM), a Random-Access Memory (RAM), an optical disk, a magnetic tape, a floppy disk, a hard disk, and a non-volatile memory, or may include carrier wave transmission (e.g., transmission over the Internet). In addition, in the computer-readable recording medium may be stored and executed the codes which are distributed in the computer system connected over the network and which may be read by the computer in a distributed manner.

As is apparent from the foregoing description, the proposed touch screen interface method may change a scale of the timeline depending on the length of a dragging that has started from the timeline on the touch screen. In other words, because the longer the dragging length is detected, the larger the timeline is zoomed-in, the content may be more finely controlled depending on the shift of the bar, making it possible to more precisely control the content even on the small touch screen just like on the large touch screen. In addition, the timeline blockage caused by the finger tip may be prevented, so the user may control the content more intuitively in the desired level.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a touch screen using a timeline bar, the method comprising:
   detecting a first dragging that starts from a bar on a timeline;
   zooming in the timeline according to a distance between the timeline and a final touch point of the first dragging; and
   shifting the bar on the zoomed-in timeline by a second dragging.

2. The method of claim 1, wherein the timeline is zoomed-in in proportion to the distance.

3. The method of claim 2, wherein the first dragging is a multi-touch dragging in which an area of the timeline is detected as a touch point.

4. The method of claim 3, wherein if a distance between two touch points is decreased by the multi-touch dragging, the timeline is zoomed-out.

5. The method of claim 1, wherein the first dragging and the second dragging are performed consecutively.

6. The method of claim 1, wherein the first dragging is performed in a first direction of the touch screen, and the second dragging is performed in a second direction of the touch screen, the first direction being substantially orthogonal to the second direction.

7. The method of claim 1, wherein the final touch point of the first dragging is determined when the distance between the timeline and the touch point remains unchanged for a predetermined time or more.

8. The method of claim 1, further comprising restoring the zoomed-in timeline to an initial form thereof if the touch is released after the second dragging.

9. The method of claim 1, wherein a content frame in a position corresponding to a position of the bar shifted by the second dragging is displayed on the touch screen.

10. The method of claim 1, wherein the first dragging and the second dragging are dragging gestures by a user's finger tip.

11. The method of claim 1, wherein identification markers are displayed on the timeline at regular intervals.

12. A non-transient, computer-readable recording medium in which a program command for implementing the method as set forth in claim 1 is recorded.

13. A mobile device comprising a touch screen and a control apparatus for controlling the touch screen using a timeline bar,
   wherein the control apparatus is implemented using computer-readable code stored in a non-transient, computer-readable recording medium, and includes a timeline bar generator configured to generate a timeline and a bar on the touch screen, a touch detector configured to detect a length of a first dragging that starts from the generated timeline, and a controller configured to zoom in the timeline according to the dragging length detected by the touch detector.

14. The mobile device of claim 13, wherein the controller zooms in the timeline according to a distance between the timeline and a touch point, if the distance between the timeline and the touch point remains substantially unchanged for a predetermined time.

15. The mobile device of claim 14, wherein the controller shifts the bar displayed on the touch screen depending on a touch point of a second dragging that is performed after the timeline is zoomed-in.

16. The mobile device of claim 15, further comprising a display configured to display a content frame corresponding to a position of the shifted bar.

17. A non-transient recording medium in which a program command for driving the mobile device as set forth in claim 13 is recorded.

* * * * *